United States Patent
Brunick et al.

(10) Patent No.: US 8,070,227 B2
(45) Date of Patent: Dec. 6, 2011

(54) CAR SEAT WITH CONVERTIBLE BOTTOM

(75) Inventors: Daniel J. Brunick, East Earl, PA (US); Neil C. Penza, Boyertown, PA (US); Craig Weber, Philadelphia, PA (US)

(73) Assignee: Graco Children's Products Inc., Atlanta, GA (US)

( * ) Notice: Subject to any disclaimer, the term of this patent is extended or adjusted under 35 U.S.C. 154(b) by 243 days.

(21) Appl. No.: 12/275,637

(22) Filed: Nov. 21, 2008

(65) Prior Publication Data

US 2009/0127893 A1    May 21, 2009

Related U.S. Application Data

(60) Provisional application No. 60/989,490, filed on Nov. 21, 2007.

(51) Int. Cl.
 *B60N 2/26* (2006.01)
 *A47D 1/10* (2006.01)

(52) U.S. Cl. ............ 297/256.13; 297/256.1; 297/256.11

(58) Field of Classification Search .................. 297/131, 297/132, 42, 54, 256.11, 271.4, 256.13
See application file for complete search history.

(56) References Cited

U.S. PATENT DOCUMENTS

| | | | | | |
|---|---|---|---|---|---|
| 1,109,717 | A | * | 9/1914 | Van Dusen | 297/32 |
| 1,440,132 | A | * | 12/1922 | Chrisman | 248/439 |
| 1,739,366 | A | * | 12/1929 | Lang | 297/37 |
| 2,603,274 | A | * | 7/1952 | McClernon | 297/37 |
| 4,688,850 | A | * | 8/1987 | Brownlie et al. | 297/270.2 |
| 4,989,888 | A | * | 2/1991 | Qureshi et al. | 280/30 |
| 5,069,503 | A | * | 12/1991 | Martinez | 297/54 |
| 5,106,154 | A | * | 4/1992 | Kain | 297/256.14 |
| 5,551,751 | A | * | 9/1996 | Sedlack et al. | 297/256.13 |
| 5,681,082 | A | * | 10/1997 | Drexler | 297/256.1 |
| 5,957,531 | A | * | 9/1999 | Kane et al. | 297/256.14 |
| 6,017,088 | A | | 1/2000 | Stephens et al. | |
| 6,042,182 | A | | 3/2000 | Geis et al. | |
| 6,347,832 | B2 | * | 2/2002 | Mori | 297/256.13 |
| 6,685,266 | B2 | * | 2/2004 | James et al. | 297/250.1 |
| 6,773,064 | B2 | * | 8/2004 | Treen et al. | 297/255 |

* cited by examiner

*Primary Examiner* — David Dunn
*Assistant Examiner* — Philip Gabler
(74) *Attorney, Agent, or Firm* — Lempia Summerfield Katz LLC

(57) ABSTRACT

A car seat is configured to rest on a seat of a vehicle and to support a child, and the car seat has a shell with a front side and a rear side and a seating surface on the front side. A first contact surface is defined on a part of the car seat facing generally opposite the seating surface. The first contact surface is oriented to support the car seat with the seating surface at a first seat incline. One or more adapter bodies are carried on the car seat and movable between a stowed position and a deployed position. The one or more adapter bodies each define a second contact surface. With the adapter bodies in the stowed position, the first contact surface is exposed to rest on the vehicle seat. With the adapter bodies in the deployed position, the one or more second contact surfaces are exposed and oriented to support the car seat with the seating surface at a second seat incline different than the first seat incline.

19 Claims, 7 Drawing Sheets

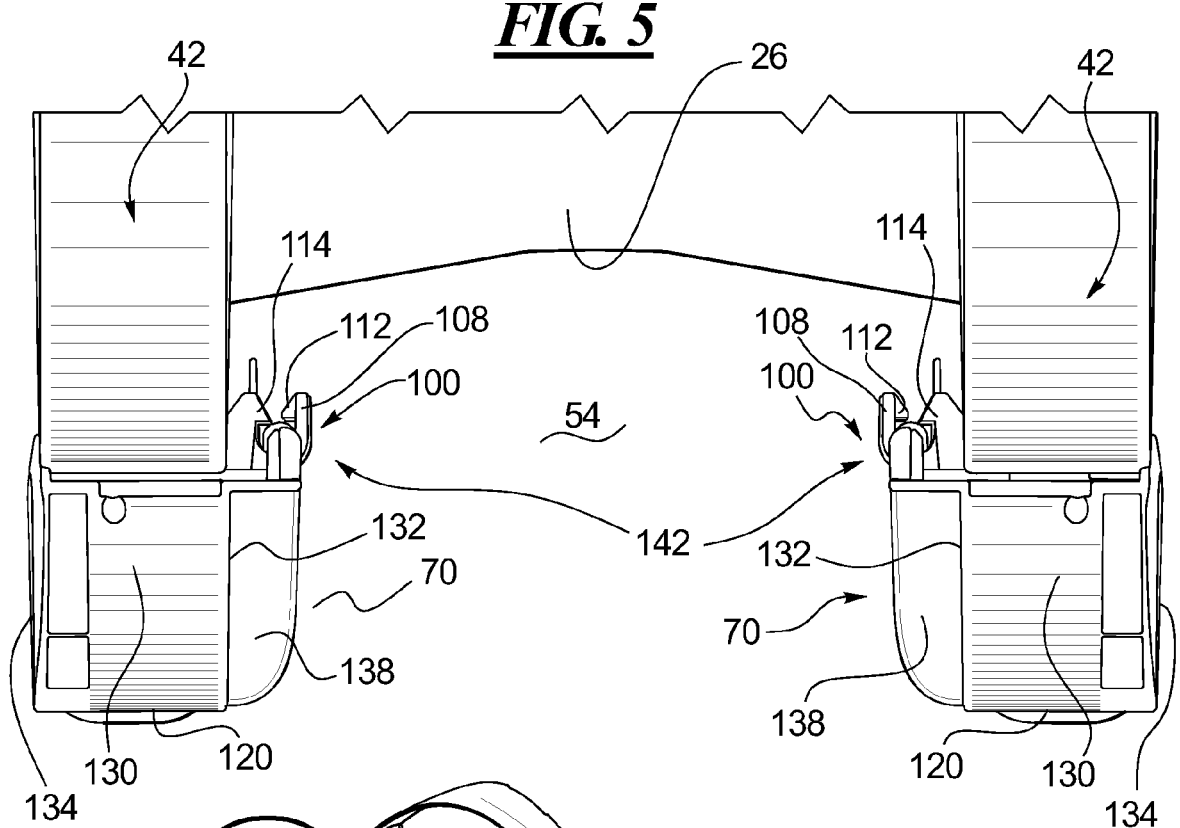
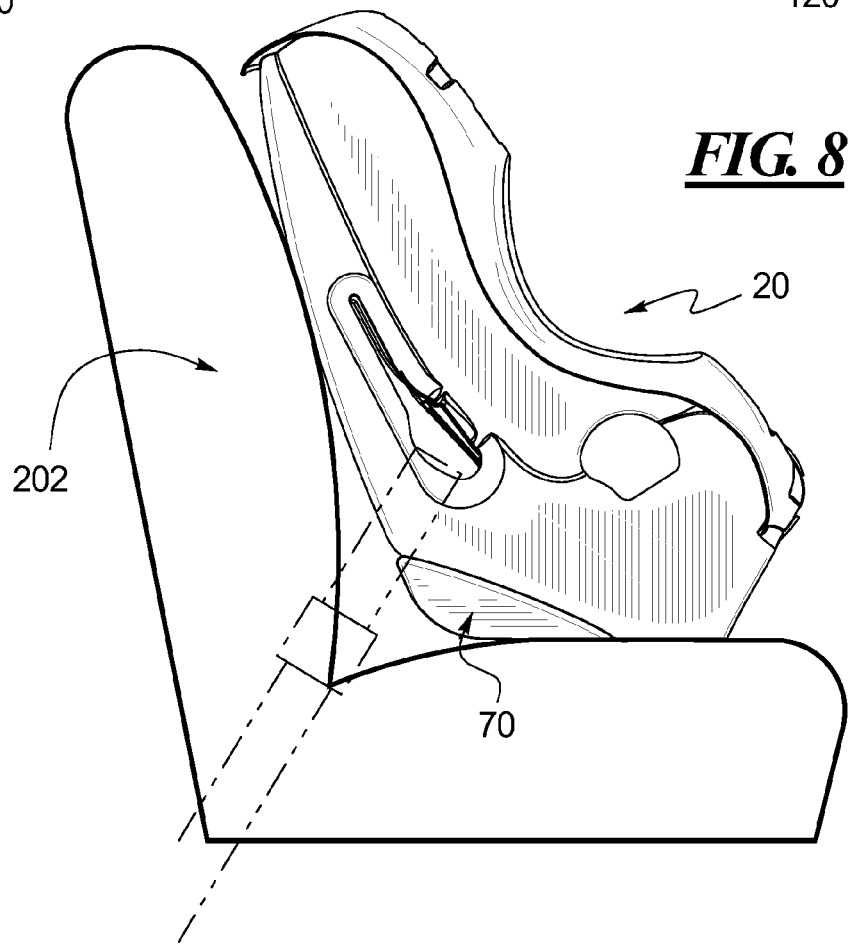

CAR SEAT WITH CONVERTIBLE BOTTOM

RELATED APPLICATION DATA

This patent is related to and claims priority benefit of U.S. provisional application Ser. No. 60/989,490 entitled "Car Seat with Convertible Bottom," which was filed on Nov. 21, 2007. The entire contents of the prior filed provisional application are hereby incorporated by reference.

BACKGROUND OF THE INVENTION

1. Field of the Disclosure

The present disclosure is generally directed to infant or children's car seats, and more particularly to a car seat with a bottom that can be converted so as to adjust the incline angle of the seat.

2. Description of Related Art

Car seats are known in the art that can be converted from rear facing infant car seats to forward facing older infant or toddler seats. The mechanisms and methods currently used to allow conversion of such known car seats have a number of problems and disadvantages. In one example, a discrete device may be provided that is manually slipped under the seat at one end or the other in order to change the seat incline angle. This type of device can move around during use and is susceptible to being improperly placed or positioned under the seat. This type of device can also be misplaced or lost, making it unavailable when one needs or desires to change the seat incline and/or seat facing direction of the car seat.

In another example, a stand leg is provided on some car seats under or behind the seat bottom and near the back end of the seat. The typical stand leg can either be pivoted rearward or slid downward from a stowed position located under or behind the seat bottom to an extended position projecting downward from the bottom of the car seat (see FIG. 10). With the stand leg stowed under the seat bottom, the seat bottom surfaces rest flush on a vehicle seat, typically with the car seat oriented in a rear facing position. With the stand leg extended, the car seat can be reoriented and turned around, typically to a forward facing position. However, the car seat rests only on the stand leg and a front edge of the car seat bottom surface.

The pivotable-type stand leg of this type of prior art seat often rotates about an axis that is oriented perpendicular to the longitudinal or front-to-back center axis of the car seat. In the forward seat facing orientation, the contact area between the car seat and the vehicle seat on which it rests is compromised. This limited surface-to-surface contact can adversely affect the stability of the seat during use in the forward facing orientation and also can affect crash test results. The stand leg may also not be particularly stable on some car seats. The pivot axis also is oriented perpendicular to the normal direction of a vehicle's movement and thus some stand legs could unintentionally rotate from the extended position during sudden deceleration of the vehicle or a sudden change in the vehicle's momentum. The stand leg on some prior art car seats, when extended, are used to create the rearward seat facing orientation and, when stowed, to create the forward seat facing orientation. However, the stand leg may have an adverse affect on the seat performance in at least one of the two seat orientations. A number of car seat manufacturers have used this type of stand leg with a laterally or transversely oriented pivot axis.

Other manufacturers sometimes use much more complex two-position bases onto which a car seat can be mounted. Such bases typically have one section that can be slid or pivoted relative to another section in order to alter the seat incline when mounted to the base. These types of two position bases typically have a significant number of parts which can be more complex to adjust when in use and more difficult and time-consuming to assemble and to convert from one seat incline to the other. Thus, such car seats can also be more expensive to manufacture and more costly for the consumer.

BRIEF DESCRIPTION OF THE DRAWINGS

Objects, features, and advantages of the present invention will become apparent upon reading the following description in conjunction with the drawing figures, in which:

FIG. 5 shows a fragmentary rear view of the car seat in FIG. 1 and viewed from the direction of the arrows V-V in FIG. 3.

FIG. 8 shows a side view of the car seat in FIGS. 1 and 3-5 installed on a vehicle seat in a forward seat facing orientation.

DETAILED DESCRIPTION OF THE DISCLOSURE

A convertible car seat is disclosed herein that solves or improves upon one or more of the above noted and/or other problems and disadvantages with prior art car seats. The disclosed car seat employs adapter bodies or feet on the bottom of the seat, which can move between a stowed position and a deployed position. In one example, the bodies can be rotated about an axis that is oriented longitudinally, i.e., front to back, relative to the car seat so that the adapter bodies pivot side to side. This orientation renders the car seat and adapters more stable during use within a vehicle. The disclosed adapters also create or expose relatively sizeable support or contact surfaces, both when deployed and when stowed. This can result in a stable car seat whether installed on a vehicle seat in a forward or rearward seat facing orientation. The disclosed car seat is also relatively easy to convert between one orientation with the adapters stowed and another orientation with the adapters deployed. These and other objects, features, and advantages of the present invention will become apparent upon reading the following disclosure and reviewing the accompanying drawing figures.

Figure 1:
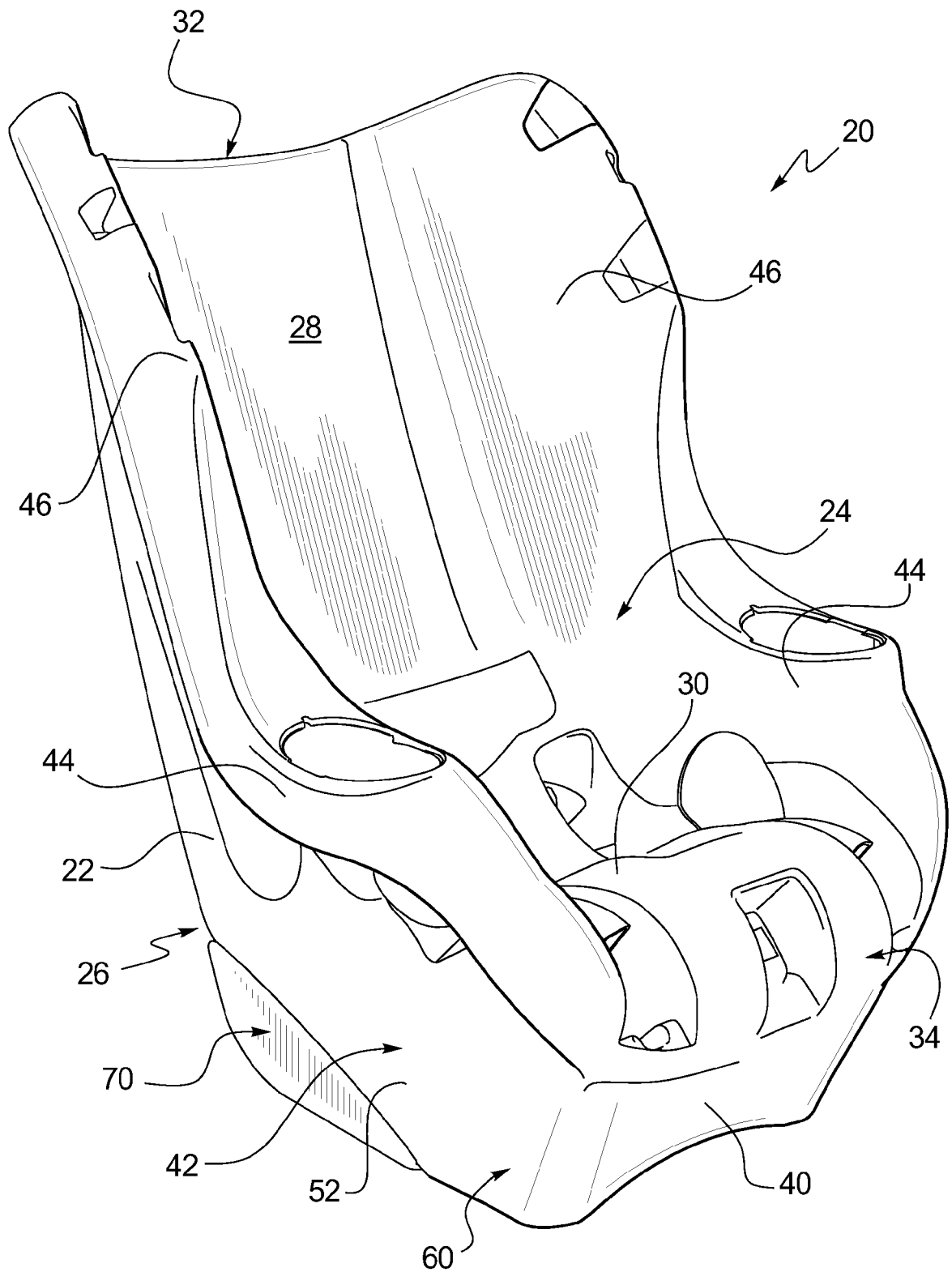
FIG. 1 shows a perspective view of one example of a car seat constructed in accordance with the teachings of the present invention and arranged with convertible feet in a deployed position.

Turning now to the drawings, FIG. 1 illustrates a car seat 20 constructed in accordance with the teachings of the present invention. In general, the car seat 20 in this example has a seat shell 22 with a top or front side 24 and a bottom or underside 26. A seating surface is defined on the front side 24. A conventional car seat typically has a seating surface with a seat back surface 28 to support a child's back during use and a seat bottom surface 30 to support the child's derriere and legs during use. With reference to FIG. 1, the car seat 20 thus has a seat back end 32 that corresponds to the location of the seat back surface 28 and a seat bottom end 34 that corresponds to the location of the seat bottom surface 30.

A typical car seat generally has a number of additional components and elements, which have been removed from the illustrations presented herein to simplify the description relating hereto. For example, a typical car seat might include a seat harness, anchor straps, buckles, and soft goods covering at least the seating surface of the shell 22. These elements have no bearing on the scope and spirit of the present invention and are thus not disclosed or described herein. In addition, the disclosed car seat 20 represents one of many possible alternate car seat examples for which the disclosed invention may be well suited. As a result, the car seat 20 can vary from that disclosed and described herein and yet fall within the spirit and scope of the present invention. These variations can include size, shape and contour, component construction, material usage, manufacturing processes, and the like. The shell 22 in the disclosed example is a plastic molded structure that may be assembled from several plastic or other sub-components to create the car seat, as is known in the art. These features of the car seat 20 can also vary within the spirit and scope of the present invention.

Returning to FIG. 1, the car seat 20 includes an underside structure depending generally downward beneath the seat bottom surface 30. This underside structure is formed having a closed front wall 40 on the car seat 20 and a pair of stand-offs 42 arranged front to back from the closed front wall beneath the seat bottom surface 30. In the disclosed example, the stand-offs 42 are generally parallel to one another and extend downward relative to the seat bottom surface 30 in the direction of the underside 26. The stand-offs 42 are positioned laterally spaced apart from one another across the shell 22. Each of the stand-offs 42 is positioned generally beneath an arm rest section 44 on a corresponding side of the car seat 20. Each arm rest section 44 is positioned on a side of the seat bottom surface 30 and extends upward relative thereto, as is known in the art. In the disclosed example, each arm rest surface 44 generally transitions into a side wing 46 that extends along a respective side edge of the seat back surface 28, as is also known in the art. Again, these arm rest 44 and side wing 46 features can vary considerably, or be eliminated all together, on a car seat within the spirit and scope of the present invention.

Figure 2:
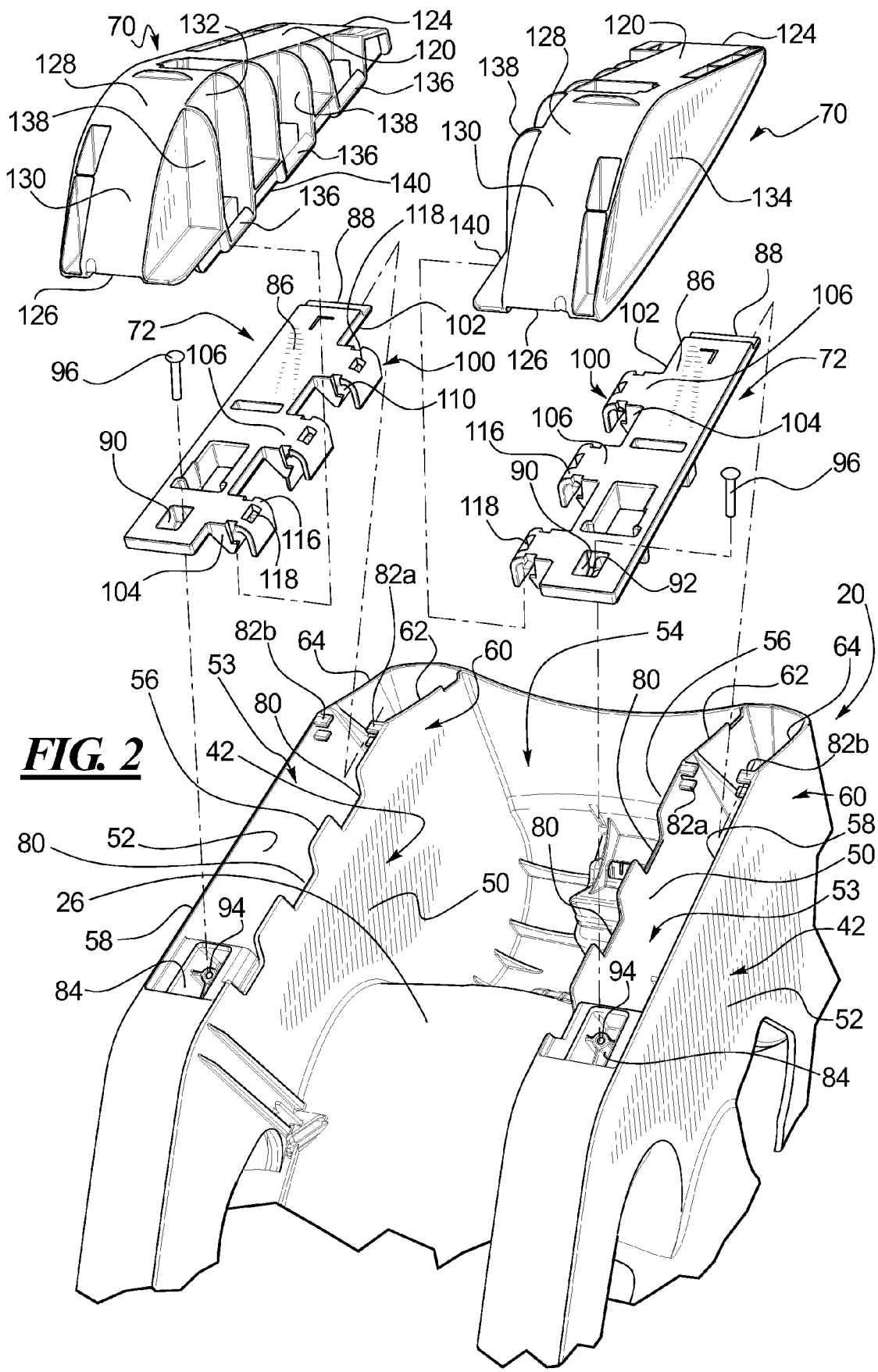
FIG. 2 shows an underside, fragmentary, exploded view of the car seat depicted in FIG. 1.

FIG. 2 shows a partly exploded view of the underside 26 of the car seat 20. Each of the stand-offs 42 is hollow in this example and has an inside wall 50, an outside wall 52, and a cavity 53 between the stand-off walls. An open space 54 is located in the gap between the inside walls 50 of the two stand-offs 42. Each inside wall 50 and outside wall 52 has a bottom edge 56 and 58, respectively, in this example. A front section 60 on each of the stand-offs 42 is defined forward of an upward bend in the bottom edges 56 and 58. An edge portion 62 on the inside walls 50 and an edge portion 64 on the outside walls of the front sections 60 forward of the bends are angled upwardly relative to a plane S-S defined by the bottom edges 56 and 58 of the stand-offs. This can be seen generally in the side view of FIG. 4. The forward regions 60 are also hollow and defined by the inside walls 50 and outside walls 52. The edges 56, 58 and the edges 62, 64 of the front regions 60 are oriented at an obtuse, oblique angle α of about 156° in this example.

In accordance with the teaching of the present invention, a pair of adapter bodies or feet 70 is moveably coupled to the underside of the car seat 20. In this example, a pair of corresponding hinge plates 72 is attached to the bottom of the stand offs 42. The hinge plates are configured to connect the feet 70 to the stand-offs 42 and thus to the underside 26 of the car seat 20. The disclosed hinge plates 72 are configured to cover a majority of the open cavities 53 on the bottoms of the stand-offs 42. The hinge plates 72 are also configured to define attachment points for the pair of feet 70 as described below. In this example, the open bottoms at the front sections 60 on the stand-offs 42 are not covered by the hinge plates and remain open, although the plates could readily be configured to cover the entire stand-off cavities.

Figure 3:
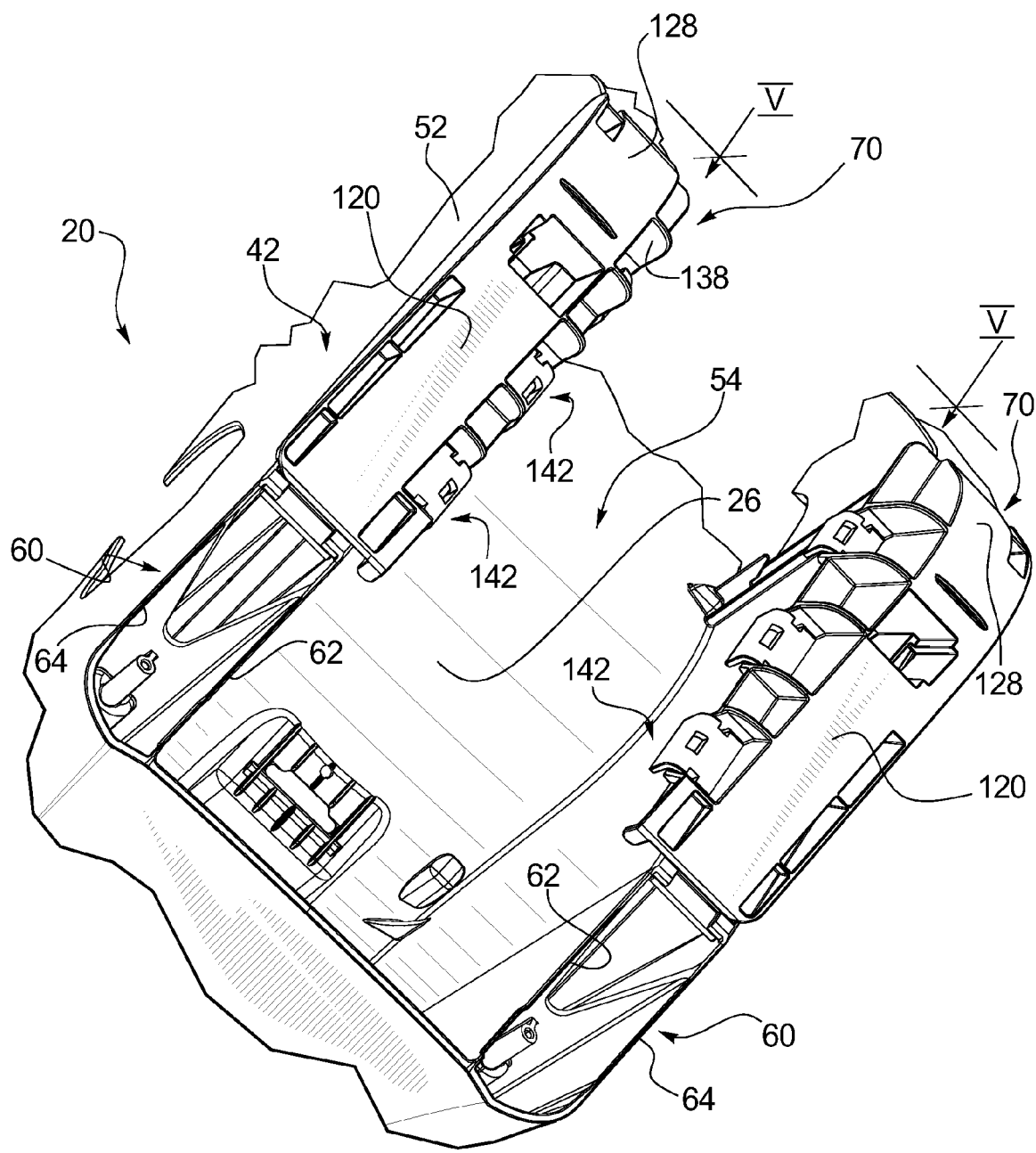
FIG. 3 shows a bottom perspective view of the car seat in FIG. 1.

Details of the shell 22, the feet 70, and the hinge plates 72 are illustrated and described herein with particularly reference to FIGS. 2, 3, and 5. The bottom edges 56 on the inside walls 50 of the stand-offs 42 has a plurality (three in this specific example) of recesses or cut-outs 80 formed into the edge. A pair of attachments tabs 82a project from an interior surface within the cavity 53 of the inside wall 50 toward the outside wall 52. A pair of like tabs 82b projects from the outside wall 52 across from, and extending toward, the tabs 82a. Each pair of tabs 82a and 82b includes an upper tab and a lower tab spaced vertically apart from one another. The pairs of tabs 82a and 82b are positioned adjacent the bend defining the front section 60 on the stand-offs 42. Each stand-off 42 also has a fastener receptacle 84 positioned within the cavity 53 and between the inside wall 50 and outside wall 52. The fastener receptacles are spaced rearward from the tab pairs and near a back end region 86 of the stand-offs. Each fastener receptacle 84 can be configured to accept a conventional threaded fastener or other suitable fastener.

With continued reference to FIGS. 2, 3, and 5, each hinge plate 72 has a bottom surface 86 and an opposed top surface (not numbered or shown herein). The top surfaces face into the cavities 53 on the stand-offs 42 when installed. A projecting lip 88 extends forward from a front edge on each of the hinge plates 72. A recessed fastener guide 90 is formed on the opposite, rear end of each hinge plate 72. Each fastener guide 90 has a fastener hole 92 that aligns with a corresponding fastener hole 94 defined within a corresponding one of the fastener receptacles 84 on the underside 26 of the car seat 20.

Each of the hinge plates 72 can be easily installed on a respective one of the stand-offs 42 in this example. The appropriate hinge plate 72 is positioned over the cavity 53 on the bottom of the corresponding stand-off 42. The lips 88 each have a thinner wall thickness than the adjacent plate material. The lips are slid between the upper and lower tabs of each tab pair 82a and 82b and sandwiched or captured between the tab pairs. The spacing of the upper and lower tabs of each pair allows the lips 88, but not the thicker plate, to slip between the tabs. The opposite ends of the hinge plates 72, including the fastener guides 90, can then be moved toward the respective fastener receptacles 84, which will automatically align the respective fastener holes 92 and 94. Appropriate fasteners 96 can then be inserted to secure the hinge plates 72 in position on the bottoms of the stand-offs 42. In this example, the bottom surface 86 on each of the fastener plates can be aligned flush with the bottom edges 56 and 58 of the respective inside and outside walls 50, 52 when installed.

Also with reference to FIGS. 2, 3, and 5, three female hinge receptacles or gudgeons 100 are spaced along and extend from an inner edge 102 on each of the hinge plates 72 has there along. The quantity and position of the female gadgeons 100 coincide with the number and location of the respective cut-outs 80 on the inside wall bottom edges 56 of the stand-offs 42. Each gudgeon 100 is integrally formed as a part of the respective hinge plate 72 in this example. Each female gudgeon 100 has one or more integral trusses 104 and a flange connector 106 that connect the gudgeon to the plate 72. The trusses 104 can be configured to give rigidity and structural integrity to the female gudgeons 100. The flange connectors 106 can also be configured with ridges, ribs, or the like to provide same.

In this example, each of the female gudgeons 100 is elongate in an axial or lengthwise direction relative to the car seat. Each gudgeon is generally U-shaped in cross section with two opposed vertical legs including an inner leg 108 adjacent the edge 102 and an outer leg 110 spaced outward from the inner leg. Each gudgeon 100 is open in an upward direction. The female gadgeons 100 on each plate 72 are axially aligned longitudinally with one another as well. The gudgeons on each hinge plate thus create a pivot or rotation axis that is oriented front-to-back on the underside 26 of the car seat 20. In this example, the legs 108, 110 of the gudgeons 100 each have a tooth 112, 114, respectively, that projects toward the other leg across the open top. For each female gudgeon 100, the tooth 112 on the inner leg 108 is located at one end of the gudgeon and the tooth 114 on the outer leg 110 is located at the opposite end of the gudgeon. Thus, though the teeth 112, 114 project toward one another, they are not positioned directly opposite one another. The teeth effectively created reduced width openings into the gudgeons 100. In this example, a closed bottom 116 connects the legs 108, 110 to one another on each gudgeon. A window or opening is formed through each of the closed bottoms 116.

Figure 4:
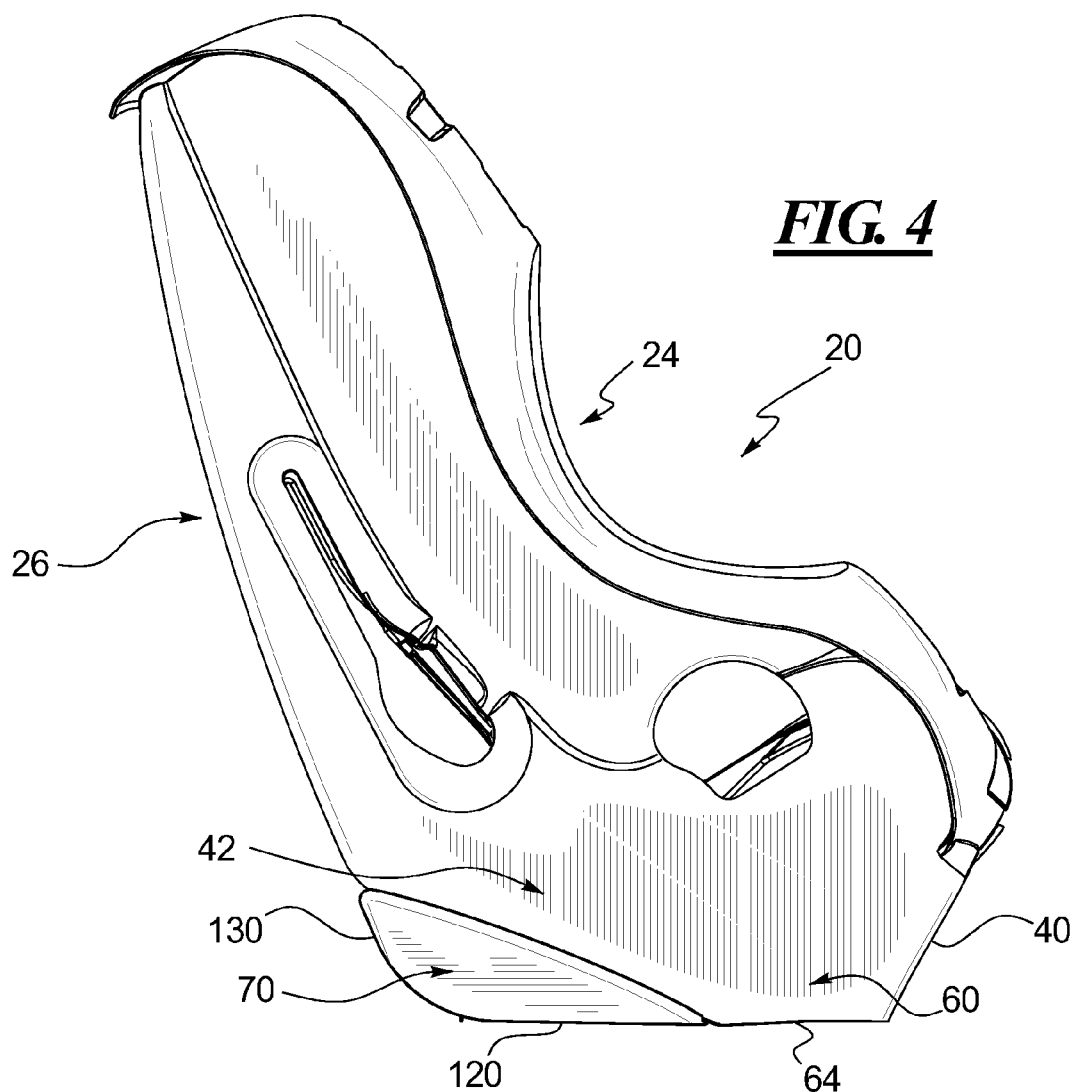
FIG. 4 shows a side view of the car seat in FIG. 3.
Figure 7:
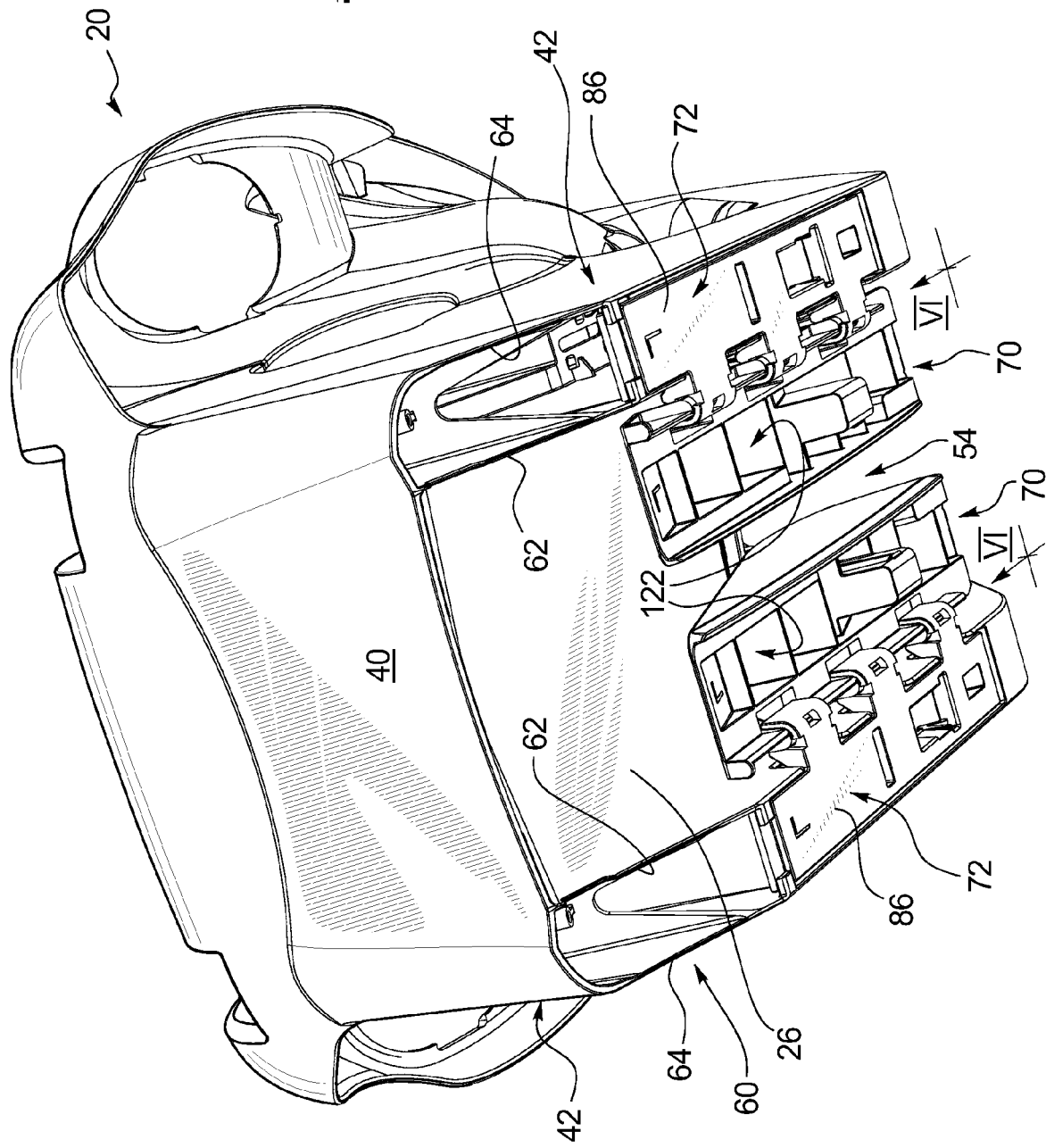
FIG. 7 shows a bottom perspective view of the car seat in FIG. 6.

With reference to FIGS. 2-5 and 9, each adapter body or foot 70 has a generally triangular shape as depicted in FIG. 4. Each foot has a support or contact surface 120 and a lag side 122 generally opposite the contact surface. The two sides 120, 122 meet at a front end or toe 124 of the foot 70 and extend rearward, diverging from one another toward a rear end 126 of the foot. The lag side 122 continues to the rear end 126 and the contact surface 124 transitions gradually at a curved corner or heel 128 to a passive back surface 130. The back surface 130 continues until meeting the lag side 122 at the rear end 126 on the foot. The lag side 122 and contact surface 120 are oriented at an angle β of about 24° in this example. The feet 70 in this example are also hollow with the lag side 122 being substantially open (see FIG. 7) and the contact surface 120 being substantially closed. As shown in FIG. 7, the interior of the feet have a plurality of laterally extending partitions or rib walls to provide rigidity and structural integrity to the feet.

Each foot also has an inner hinge side 132 and an outer free side 134 with the partitions or rib walls extending therebetween. A plurality of hinge posts or pintles 136 are integrally carried on the hinge side 132 of the feet 70. As shown in FIG. 2, a plurality of ribs 138 extends along and project from the outer surface of the hinge side 132. Each of the ribs 138 is also oriented vertically between the contact surface 120 and the lag side 122. In this example, each pintle 136 is integrally formed extending between adjacent pairs of the ribs 138. Each pintle 136 is also positioned aligned with and spaced from an inner top edge 140 of the lag side 122 on the foot 70. Each pintle 136 is also oriented generally parallel with the lag side inner edge 140. The lag side 122 is named as such herein because it does not include much of a surface (i.e., it is substantially open to the foot interior) and because it lies adjacent the pintles 136. As the feet rotate, the contact surface, being spaced from the pintles 136, will swing through a substantial arc about the pivot axis of the foot. In contrast, the lag side 122 will swing much slower and through a much smaller arc (i.e., will lag the contact surface 120) being closely positioned to the pivot axis.

The pintles 136 can be formed to define a round or ovoid cross section that is sized to seat, one each within a respective one of the gudgeons 100. To install the feet, the pintles are positioned as shown in FIG. 2 and then forcibly inserted between the teeth 112, 114 of a respective one of the gudgeons. The legs 108 and 110 of the gudgeons can resiliently flex sufficient to allow the pintles 136 to snap into place. The teeth 112, 114 will then retain the pintles 136 between the legs 108, 110 of the gudgeons. Once installed, the pintles and gudgeons create pivotable hinges 142 along the inner side of the feet and the bottom edge of the inner walls 50 on the stand-offs 42. As will be evident to those having ordinary skill in the art upon reading this disclosure, the shape and features of the pintles and gudgeons can vary considerably and yet provide a suitable hinge function. These components can be configured in many different ways within the spirit and scope of the present invention.

Figure 6:
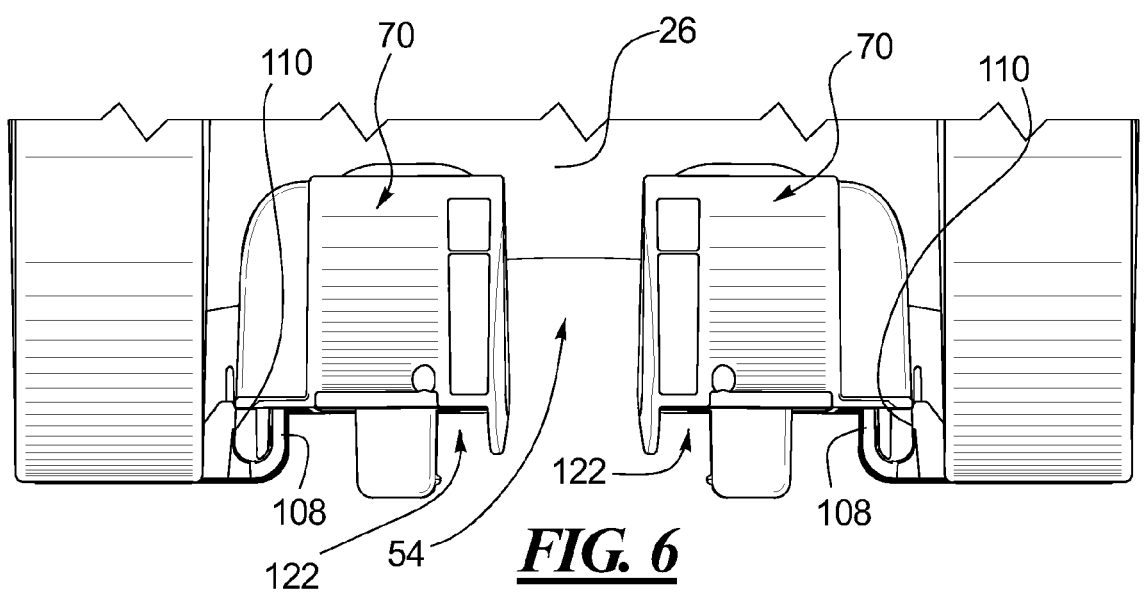
FIG. 6 shows the car seat in FIG. 5, but with the convertible feet in a stowed position and viewed from the direction of the arrows VI-VI in FIG. 7.
Figure 9:
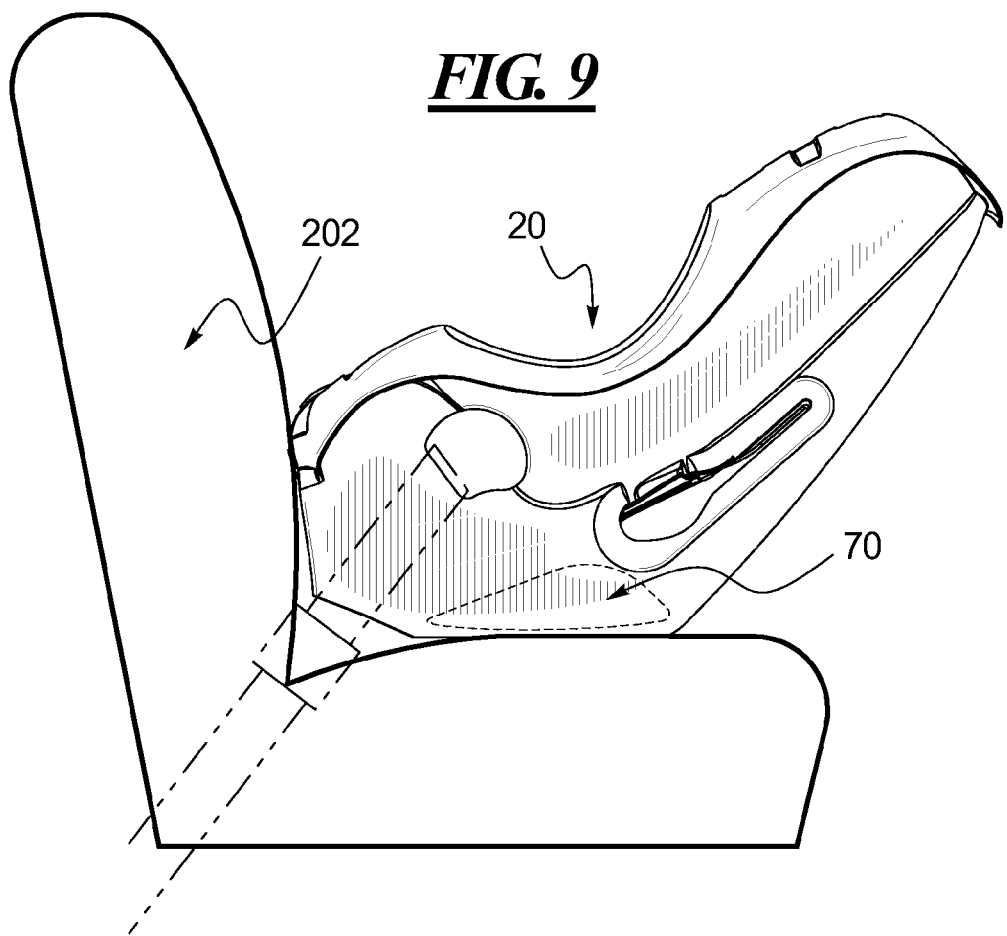
FIG. 9 shows a side view of the car seat in FIGS. 6 and 7 installed on a vehicle seat in a rear seat facing orientation.
Figure 10:
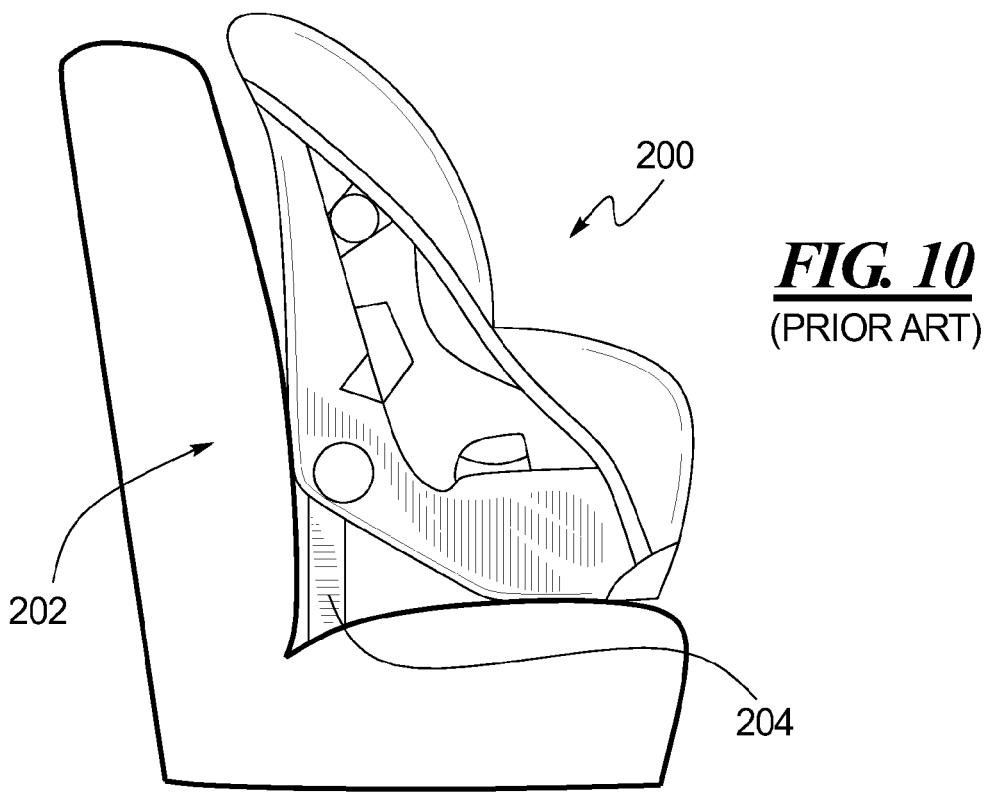
FIG. 10 shows a side view of a representative prior art car seat with a stand leg in an extended position and installed on a vehicle seat.

Once installed, the feet 70 can be moved between a deployed position as depicted in FIGS. 1-5 and 8 and a stowed position as depicted in FIGS. 6, 7, and 9. In the deployed position, each foot 70 is pivoted about the hinge 142 to a position directly below a respective stand-off 42. In this position, the lag surfaces 122 on the feet bear against and cover the bottoms of the stand-off, and specifically the portions including the hinge plates 72. This arrangement leaves the contact or support surfaces 120 on the feet exposed on the underside of the car seat. As shown in FIG. 8, the car seat 20, with the feet deployed, can rest on the contact surfaces of the feet 70. As shown in FIG. 5, each of the feet 70 has a substantial width that is greater than a width of the stand-offs between the walls 50, 52, as shown in FIG. 5. Thus, with the feet deployed, the car seat can rest on a very substantial base. In this example, the angles of the various surfaces of the feet and on the bottoms of the stand-offs are such that the contact surfaces 120 on the feet lay generally coplanar with the bottom edges of the front sections 60 on the stand-offs. This effectively extends the length of the contact or support surfaces on which the car seat can rest with the feet in the deployed position.

As shown in FIGS. 6 and 7, the feet 70 can be pivoted about the hinge axes to a stowed position. In this position, each foot is located essentially within the open space 54 between the stand offs 42 and at an elevation flush with or above the bottoms of the stand-offs. In this position, the bottoms of the stand-offs, including the hinge plates 72, are exposed as contact or support surfaces for the car seat 20. With the feet 20 stowed, the car seat can be installed on a vehicle seat resting on the bottoms of the stand-offs 42. In this position, the front sections 60 do not form part of the contact or support surfaces.

In the disclosed example, the car seat 20 rests on the feet while in the forward seat facing orientation as in FIG. 8. Thus, the feet are configures to alter the seating surface incline to a more upright position suitable for older infants and toddlers. The car seat 20 rests on the stand-offs in the rear seat facing position of FIG. 9. Because the contact surface 120 and the lag surface 122 on the feet are at an angle of 24° in this example, the seating surface incline angle will be altered by 24° between the deployed and stowed positions of the feet. As will be evident to those having ordinary skill in the art, the surface angles on both the car seat underside 26, including the stand-offs 42, and the feet 70 can vary from the 24° angle of this example. In one example, the angles on the feet can be within a range of about 20° to about 30°. Also, the location, orientation, and configuration of the stand-offs and the feet can be altered while still achieving the benefits of the present invention.

Aspects of the hinge components can also be altered and/or enhanced within the spirit and scope of the present invention. For example, the pintles can include surface dimples or projections that interact with ribs or the windows 118 on the gudgeons in order to create snap locators or positional detents that assist in retaining the feet in the two selectable positions. In other words, features can be added to the hinges 142 so that the feet will positively snap into the deployed position and/or the stowed position. Further, the feet in this example stow under the seat bottom and in the space between the stand-offs. In alternate examples, the feet could pivot outward to a stowed position and inward to a deployed position. It is also possible that one could design a car seat within the spirit and scope of the present invention within only one foot while falling within the scope of the invention.

In alternate examples, the feet need not necessarily cover the bottoms of the stand-offs in the deployed position, but instead can be positioned adjacent the stand-offs on the inside or outside thereof in each of the stowed or deployed positions. Still further, mounting structure for the feet 70 can be integrally formed as a part of the underside or bottom of the shell 22 instead of on removable hinge plates 72 as disclosed in this example. Also, the standoffs 42 can have closed bottoms and yet still be configured for attachment of the hinge plates 72 or other feet mounting structures.

Although in this example, the feet have a significant or substantial length and width, other shapes and sizes can be employed on the feet within the spirit and scope of the present invention. Lengthy and wide feet can likely provide a more stable base on which the car seat rests during use in a vehicle. Increased surface-to-surface contact between the car seat and the vehicle seat can be achieved utilizing the disclosed feet in both seat inclines and seat orientations. However, the feet 70 can be altered and yet fall within the spirit and scope of the present invention. For example, the contact surface 120 can be shaped similar to a high heeled boot or shoe. Such a foot can have a heel section and a toe section depending from a lag panel (i.e., a "sole" of the foot) located where the lag side 122 is positioned on the disclosed feet 70. A gap can be positioned between the heel and toe of the alternate foot design. The heel and toe surfaces can contact the vehicle seat when deployed, with the sole or lag panel being spaced upward from the vehicle seat surface. In another example, the toe contact portion could be eliminated. In yet another example, a plurality of depending segments could depend from a lag panel, each segment defining a contact surface on a free end and the segments becoming gradually shorter from a heel end to a toe end.

Also, the feet are disclosed as being under the seat bottom in this example. In other examples, the feet can be moved more forward or more rearward on the car seat and yet function as intended, depending on the geometry of the components. Further still, each foot is pivotable about a rotation axis in this example that is generally aligned with a fore and aft axis of the car seat. It is possible that one could conceive of a foot design with a rotation axis that is offset from the disclosed axis orientation within the spirit and scope of the invention. It is also possible that one could conceive of a multi-segment single foot design that can achieve the objectives of the invention.

As noted above, the car seat 20 tilts further forward or more inclined with the feet deployed and further rearward or more reclined with the feet stowed. It is possible to conceive of a foot and seat bottom geometry wherein the reverse is achieved. In other words, the seat might recline with the feet deployed and incline with the feet stowed. The disclosed feet also allow the car seat to be used in both a forward facing or rear facing seat orientation with the feet either deployed or stowed. This allows the incline angle for a given seat orientation to be adjusted as well.

Although certain car seats, features, functions, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A car seat configured to rest on a seat of a vehicle and to support a child, the car seat comprising:
   a shell having a front side, a rear side, a seat back end, and a seat bottom end;
   a seating surface on the front side;
   a first contact surface on a part of the car seat facing generally opposite the seating surface, the first contact surface oriented to support the car seat with the seating surface at a first seat incline; and
   feet carried on the car seat with each foot defining a second contact surface, the feet movable between a stowed position in which the first contact surface is exposed to support the car seat on the seat and a deployed position in which the second contact surfaces are exposed and oriented to support the car seat on the seat with the seating surface at a second seat incline different than the first seat incline, wherein the feet pivot side to side between the stowed position and the deployed position about a pivot axis oriented front to back relative to the seating surface.

2. A car seat according to claim 1, wherein the second contact surfaces are oriented at an oblique angle relative to the first contact surface with the feet in the deployed position.

3. A car seat according to claim 1, further comprising:
   an underside of the car seat opposite the seating surface and adjacent the seat bottom end; and
   an open space recessed upward in the underside, wherein the feet are positioned substantially in the open space in the stowed position.

4. A car seat according to claim 1, wherein the feet cover the first contact surfaces in the deployed position.

5. A car seat according to claim 1, wherein each of the feet is movably connected to a respective stand-off projecting from an underside of the car seat adjacent the seat bottom end.

6. A car seat according to claim 5, wherein the feet pivot toward one another from the deployed position to the stowed position into an open space between the stand-offs.

7. A car seat according to claim 5, wherein the first contact surface includes a respective first contact surface portion located on a bottom of each of the stand-offs.

8. A car seat according to claim 5, wherein each of the feet is connected via a hinge to the respective stand-off.

9. A car seat configured to rest on a seat of a vehicle and to support a child, the car seat comprising:
   a shell having a front side, a rear side, a seat back end, and a seat bottom end;
   a seating surface on the front side;
   a first contact surface on a part of the car seat facing generally opposite the seating surface, the first contact surface oriented to support the car seat with the seating surface at a first seat incline; and
   feet carried on the car seat with each foot defining a second contact surface, the feet movable between a stowed position in which the first contact surface is exposed to support the car seat on the seat and a deployed position in which the second contact surfaces are exposed and oriented to support the car seat on the seat with the seating surface at a second seat incline different than the first seat incline, wherein the feet each have a generally triangular shape with a lag face adjoining the respective second contact surface at a front end and oriented at an acute angle of between about 20° to about 30° relative to the respective second contact surface at the front end.

10. A car seat configured to rest on a seat of a vehicle and to support a child, the car seat comprising:
a shell having a front side, a rear side, a seat back end, and a seat bottom end;
a seating surface on the front side;
a first contact surface on a part of the car seat facing generally opposite the seating surface, the first contact surface oriented to support the car seat with the seating surface at a first seat incline; and
feet carried on the car seat with each foot defining a second contact surface, the feet movable between a stowed position in which the first contact surface is exposed to support the car seat on the seat and a deployed position in which the second contact surfaces are exposed and oriented to support the car seat on the seat with the seating surface at a second seat incline different than the first seat incline,
wherein each of the feet is movably connected to a respective stand-off projecting from an underside of the car seat adjacent the seat bottom end,
wherein the first contact surface includes a respective first contact surface portion located on a bottom of each of the stand-offs, and, wherein a front section of the bottom on each of the stand-offs is oriented at an angle relative to the respective first contact surface portion and is aligned in a common plane with the second contact surface of a respective one of the feet in the deployed position.

11. A car seat configured to rest on a seat of a vehicle and to support a child, the car seat comprising:
a shell having a front side, a rear side, a seat back end, and a seat bottom end;
a seating surface on the front side;
a first contact surface on a part of the car seat facing generally opposite the seating surface, the first contact surface oriented to support the car seat with the seating surface at a first seat incline;
feet carried on the car seat with each foot defining a second contact surface, the feet movable between a stowed position in which the first contact surface is exposed to support the car seat on the seat and a deployed position in which the second contact surfaces are exposed and oriented to support the car seat on the seat with the seating surface at a second seat incline different than the first seat incline;
stand-offs projecting from an underside of the car seat adjacent the seat bottom end; and
a hinge movably connecting each of the feet to a respective one of the stand-offs, each hinge having:
a hinge plate mounted to a bottom of each of the stand-offs;
one or more hinge gudgeons carried on each of the hinge plates; and
a corresponding number of hinge pintles carried on each of the feet, the pintles being pivotally retained in the gudgeons.

12. A car seat according to claim 9, wherein the feet are substantially within an open space in an underside of the car seat on the rear side adjacent the seat bottom end when in the stowed position.

13. A car seat according to claim 12, further comprising:
a pair of front-to-back elongate stand-offs projecting from the underside and defining the open space therebetween; and
a pair of the first contact surfaces, one on a bottom of each of the stand-offs, wherein each foot is pivotally connected to a respective one of the stand-offs.

14. A car seat according to claim 9, further comprising:
two of the first contact surfaces, wherein one of the two feet covers a respective one of the two first contact surfaces in the deployed position.

15. A car seat according to claim 9, wherein the feet are pivotable between a deployed position at least partly external of an open space under the seating surface and between a pair of the first contact surfaces on the shell and a stowed position substantially within the open space and exposing the first contact surfaces to support the car seat.

16. A car seat according to claim 9, wherein each foot pivots about an axis parallel to the orientation of the first contact surfaces.

17. A car seat according to claim 9, wherein the feet pivot toward one another to the stowed position within the open space under a seat bottom part of the seating surface.

18. A car seat according to claim 9, wherein the feet cover the first contact surfaces in the deployed position and expose the first contact surfaces in the stowed position.

19. A car seat according to claim 1, wherein the feet each have a generally triangular shape with a lag face adjoining the respective second contact surface at a front end and oriented at an acute angle of between about 20° to about 30° relative to the respective second contact surface at the front end.

* * * * *